(12) United States Patent
Hui et al.

(10) Patent No.: US 8,199,865 B2
(45) Date of Patent: *Jun. 12, 2012

(54) METHOD AND DEVICE FOR SYNCHRONIZATION AND CHANNEL ESTIMATION IN A RADIO RECEIVER

(75) Inventors: Dennis Hui, Cary, NC (US); Abdulrauf Hafeez, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1207 days.

This patent is subject to a terminal disclaimer.

(21) Appl. No.: 11/993,522

(22) PCT Filed: Jun. 28, 2005

(86) PCT No.: PCT/IB2005/001840
§ 371 (c)(1),
(2), (4) Date: Dec. 21, 2007

(87) PCT Pub. No.: WO2007/000620
PCT Pub. Date: Jan. 4, 2007

(65) Prior Publication Data
US 2010/0248666 A1 Sep. 30, 2010

(51) Int. Cl.
*H04L 7/00* (2006.01)
*H04B 17/00* (2006.01)
(52) U.S. Cl. ..... 375/355; 375/340; 375/350; 455/67.13; 455/226.1; 455/296

(58) Field of Classification Search ................... 375/340, 375/341, 346, 348, 350, 355; 455/63.1, 67.11, 455/67.13, 226.1, 296
See application file for complete search history.

(56) References Cited

U.S. PATENT DOCUMENTS

| 6,674,820 B1 | 1/2004 | Hui et al. | |
|---|---|---|---|
| 6,862,326 B1 * | 3/2005 | Eran et al. | 375/350 |
| 7,212,593 B2 * | 5/2007 | He | 375/346 |
| 2005/0079826 A1 | 4/2005 | He | |

FOREIGN PATENT DOCUMENTS

| WO | WO 2005/041507 A | 5/2005 |
|---|---|---|
| WO | WO 2005/048548 A | 5/2005 |

* cited by examiner

*Primary Examiner* — Quochien B Vuong
(74) *Attorney, Agent, or Firm* — Roger S. Burleigh

(57) ABSTRACT

A device and method in a radio receiver for generating synchronization and channel estimation information based on three parameters consisting of a synchronization position, at least one whitening filter parameter, and a channel estimate. A spatially and temporally stacked signal model is generated by stacking successive samples of temporally adjacent received signal vectors and corresponding training vectors. Initial estimates of a first one or two of the three parameters are then generated based on the spatially and temporally stacked signal model. The rest of the three parameters are then computed based on the initial estimates of the first one or two parameters. If a stopping criterion is met, the method ends and the parameters are used to process the signal. If the stopping criterion is not met, additional iterations are performed to improve the synchronization and estimation information.

17 Claims, 9 Drawing Sheets

METHOD AND DEVICE FOR SYNCHRONIZATION AND CHANNEL ESTIMATION IN A RADIO RECEIVER

FIELD OF THE INVENTION

The present invention relates to radio telecommunication systems. More particularly, and not by way of limitation, the present invention is directed to a method and device in a radio receiver for generating synchronization and channel estimation information with adaptive spatial/temporal whitening.

BACKGROUND OF THE INVENTION

The increasing popularity of mobile communications has placed a tremendous demand on the scarce radio resources of cellular communication networks. To efficiently utilize these valuable resources, radio frequencies in Time Division Multiple Access (TDMA) cellular systems such as GSM/EDGE, are being reused with closer proximity than ever. As a result, mutual interference among users occupying the same radio channel has become a major source of signal disturbance. The ability to suppress co-channel interference has become increasingly important for mobile receivers in cellular systems with tight reuse.

Multi-branch diversity or array processing is a class of commonly used techniques for suppressing interference, in which multiple versions of the same transmitted signal are produced and processed jointly in the receiver in order to cancel one or more interfering signal(s). The different signal versions may be obtained by using multiple receiving antennas, by sampling the received signal over the baud rate of transmission (i.e., oversampling), by separating in-phase (I) and quadrature-phase (Q) of the signal, or by combinations of these. The method of separating in-phase (I) and quadrature-phase (Q) of the signal is commonly referred to as the single-antenna-interference cancellation (SAIC) method and has recently received much attention in GERAN standardization.

In conventional array processing, the interference is typically modeled as temporally (across time) and/or spatially (across different signal versions) colored noise. By performing proper spatial and/or temporal noise whitening, the interference can be suppressed substantially. Such whitening operation may be performed before or during demodulation/equalization.

The demodulator or equalizer in a mobile receiver typically requires an estimate of the channel response of the received signal. In addition, the demodulator or equalizer must also be able to synchronize to the beginning of a data burst in order to begin demodulation. The synchronization and channel estimation process is typically done over a sequence of training symbols in each data burst that is known to the receiver. When spatial/temporal whitening is performed during equalization or demodulation, the operating carrier-to-interference power ratio (C/I) can be changed so drastically that the ordinary method of synchronization and channel estimation, such as the least-squares (LS) method, can no longer produce an accurate synchronization position or channel estimate. As a result, the reliability of synchronization and channel estimation becomes a bottleneck of the overall receiver performance.

One known way of improving synchronization and quality of channel estimation in a multi-branch receiver is to re-synchronize and re-estimate a whitened channel response over a sequence of training symbols after applying a spatial-temporal whitening filter to the received signal. Such a whitening filter can be computed using the well-known Whittle-Wiggins-Robinson Algorithm (WWRA) (or sometimes referred to as the generalized Levinson-Durbin algorithm) based on the residual signal generated by a simple channel estimator such as the least-squares channel estimator. Alternatively, the whitened channel response and the whitening filter coefficients may be jointly estimated using the known indirect generalized least-squares (iGLS) algorithm. Note that the whitening filter coefficients computed using either the WWRA or the iGLS algorithm are square matrices.

Conventional methods of channel estimation with spatial-temporal whitening focus on the estimation of whitened channel response. These methods do not exploit the convolutional structure of the whitened channel, and thus attempt to estimate more unknown parameters than is needed. As a result, the quality of the channel estimate suffers. What is needed in the art is an improved method and device in a radio receiver for generating synchronization and channel estimation information that overcomes such deficiencies.

SUMMARY OF THE INVENTION

In one aspect, the present invention is directed to a method in a radio receiver of generating synchronization and channel estimation information based on three parameters consisting of a synchronization position, at least one whitening filter parameter, and a channel estimate. The method includes the steps of generating a spatially and temporally stacked signal model by stacking successive samples of temporally adjacent received signal vectors and corresponding training vectors and iteratively estimating the three parameters, wherein the iterative estimation process includes generating initial estimates of a first one or two of the three parameters based on the spatially and temporally stacked signal model, and computing the remaining parameters based on the initial parameter estimates. The estimates of the first one or two parameters are then updated followed by an updated estimate of the remaining parameters, until a stopping criterion is met.

In one embodiment, the present invention generates an initial channel estimate and an initial estimate of a synchronization position for the received signal based on the spatially and temporally stacked signal model, and then computes a whitening filter based on the initial channel estimate and synchronization position.

In another embodiment, the present invention generates an initial estimate of a whitening filter based on the spatially and temporally stacked signal model; generates a whitened signal and training sequence based on the initial estimate of the whitening filter; finds a synchronization position based on the whitened signal and whitened training sequence; and computes a channel estimate based on the whitened signal and whitened training sequence.

In another embodiment, the present invention generates an initial channel estimate based on the spatially and temporally stacked signal model; finds a synchronization position for the received signal based on the initial channel estimate; computes a whitening filter based on the initial channel estimate and the synchronization position; generates a whitened signal and a whitened training sequence based on the computed whitening filter; and computes an improved channel estimate based on the whitened signal and whitened training sequence.

In another embodiment, the present invention generates initial estimates of a whitening filter and a synchronization position based on the spatially and temporally stacked signal model; generates a whitened signal and a whitened training sequence based on the initial whitening filter; and computes a channel estimate based on the whitened signal and whitened training sequence.

In yet another aspect, the present invention is directed to a device in a radio receiver for generating synchronization and channel estimation information based on three parameters. The parameters consist of a synchronization position, at least one whitening filter parameter, and a channel estimate. The device includes means for generating a spatially and temporally stacked signal model by stacking successive samples of temporally adjacent received signal vectors and corresponding training vectors; means for generating initial estimates of a first one or two of the three parameters based on the spatially and temporally stacked signal model; and means for computing the remainder of the three parameters based on the initial estimates of the first one or two parameters.

DESCRIPTION OF THE INVENTION

Figure 1:
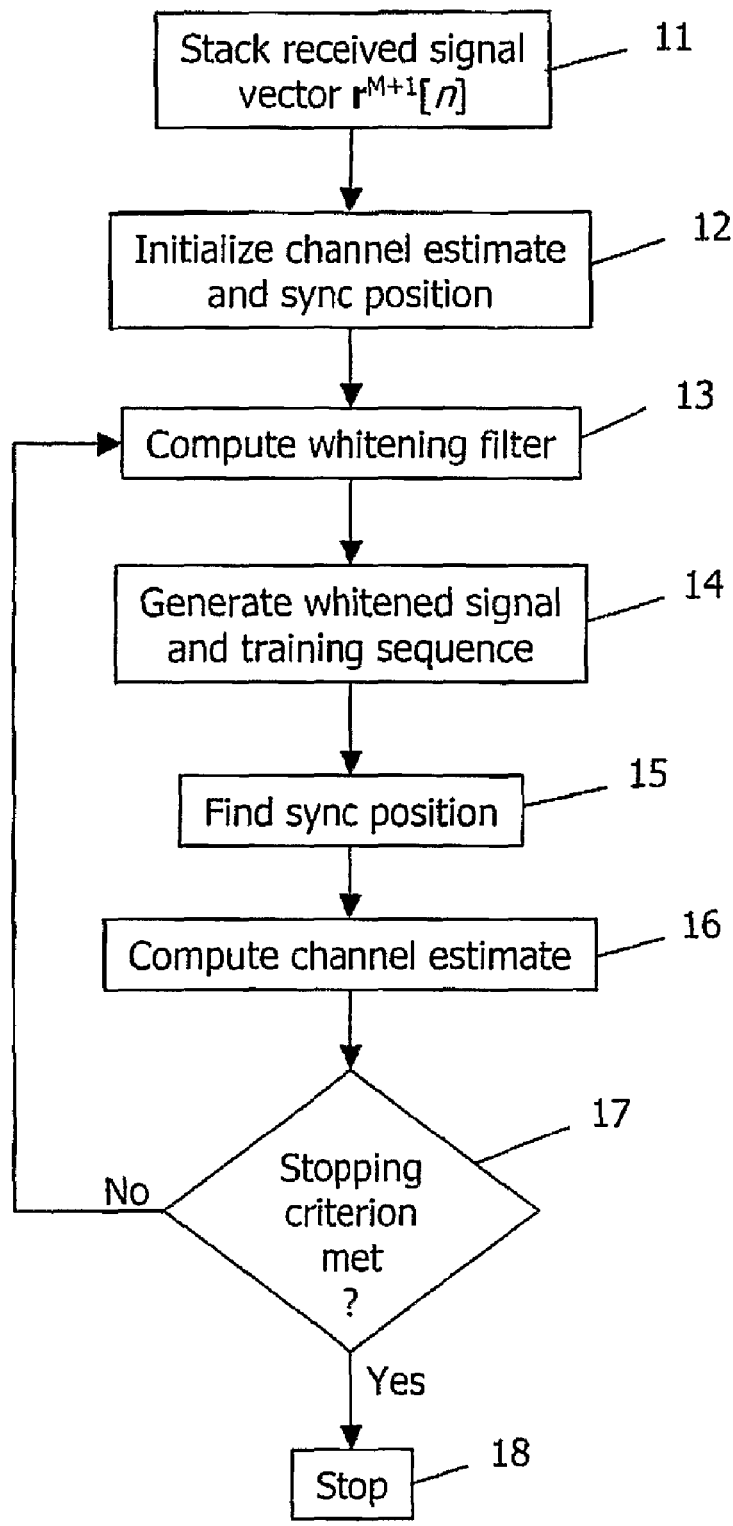
FIG. 1 is a flow chart of a first embodiment of the method of the present invention.

The present invention generates an estimate of the original non-whitened channel response for spatially and temporally colored noise with unknown statistics. The invention utilizes an iterative estimation method based on a spatial and temporally stacked signal model. Unlike the conventional iGLS algorithm, however, the present invention allows efficient sharing of intermediate results produced at adjacent hypothesized synchronization positions and therefore has lower computational requirements than the brute-force application of the iGLS algorithm at all synchronization positions. Moreover, as shown below, the present invention provides significantly better performance than the conventional iGLS method when there are multiple interferers. Note that the whitening filter coefficients computed using either the WWRA or the iGLS algorithm are always square matrices. However, the whitening filter coefficients produced by the present invention may be non-square matrices. Therefore, whitening filters computed utilizing the present invention are fundamentally different from those computed by tradition algorithms.

Consider the following typical, dispersive multiple-input-multiple-output (MIMO) signal model with additive noise:

$$r[n+n_0] = \sum_{k=0}^{L-1} C[k]s[n-k] + v[n]$$

for n=L−1, L, . . . , N−1, where N denotes the length of the training sequence (N=26 for GSM/EDGE), r[n] denotes a $N_r$-dimensional received (column) vector (for example, formed by stacking in-phase (I) and quadrature-phase (Q) components of a received signal, oversampling of the received signal, utilizing multiple antennas, or combinations of these), $n_0$ denotes the synchronization position, which is the time index of the first symbol of the training period, {C[k]} denotes a $N_r$ by $N_t$ MIMO channel response, {s[n]} denotes possibly $N_t$-dimensional training vector (for example, formed by stacking I and Q components of training symbols, training symbols of multiple users, etc.), and {v[n]} denotes a spatially and temporally colored noise process used to model the interference. Also, let Π denote a (finite) set of possible synchronization positions.

The following description utilizes a stacked vector notation. Let $r^{M+1}[n] \equiv vec([r[n], r[n-1], \ldots r[n-M]]) = [r[n]^T, r[n-1]^T, \ldots r[n-M]^T]^T$ be a vector formed by stacking $\{r[k]\}_{k=n-M}^{n}$ in a column, where M denotes the "model order", and for any matrix A, vec(A) is the vector formed by stacking columns of A one by one into a single column vector, i.e. using matlab notation, vec(A)≡A(:).

Similarly, let $v^{M+1}[n] \equiv vec([v[n], v[n-1,], \ldots v[n-M]])$ denote the corresponding stacked noise vector, and let $s^L[n] \equiv vec([s[n], s[n-1], \ldots, s[n-L+1]])$ denote the corresponding stacked training vector.

The present invention provides a method for estimating the synchronization position $n_0 \in \Pi$ and the non-whitened channel estimate C≡(C[0], C[1], . . . , C[L−1]) by adaptively computing and applying a spatial-temporal (ST) whitening filter F=(F[0], F[1], . . . , F[M]), to the received signal, where F[i] denotes the i-th matrix filter coefficient (which can be non-square). A by-product of the invention is the ST whitening filter F for suppressing v[n].

The present invention iteratively estimates the ST whitening filter F, the channel response C, and the synchronization position $n_0$. The order of iteration may be selected between F→$n_0$→C and $n_0$→F→C. Thus, in one order, the iteration may start with an initial estimate of C and $n_0$, followed by a first computation of the whitening filter F. Alternatively, using the same order, the iteration may start with an initial estimate of F, followed by a first computation of the synchronization position $n_0$ and the channel estimate C. In the other order, which moves in the opposite direction, the iteration may start with an initial estimation of C, followed by a first computation of the synchronization position $n_0$ and the whitening filter F. Alternatively, using the same order, the iteration may start with an initial estimate of F and $n_0$, followed by a first computation of the channel estimate C. Both orders increase the value of the log likelihood function after each iteration.

FIG. 1 is a flow chart of a first embodiment of the method of the present invention in which the order of iteration F→$n_0$→C is utilized. In this embodiment, the iteration starts with an initial estimate of C and $n_0$, followed by a first computation of the whitening filter F. At step 11, a stacked received signal vector $r^{M+1}[n]$ is generated. At step 12, the channel estimate C and the synchronization position $n_0$ are initialized. At step 13, the whitening filter $\hat{F}$ is computed in a first iteration based on the fixed values of the channel estimate C and the synchronization position $n_0$. In the preferred embodiment, the whitening filter estimate $\hat{F}$ is computed as the "square root" of the inverse of the matrix:

$$\hat{\Lambda} \equiv \sum_{n=L+M-1}^{N-1} \left( r^{M+1}[n+\hat{n}_0] - T(\hat{C})s^{L+M}[n] \right)\left( r^{M+1}[n+\hat{n}_0] - T(\hat{C})s^{L+M}[n] \right)^H \quad (1)$$

such that $\hat{F}^H\hat{F} = \hat{\Lambda}^{-1}$, where:

$$T(C) \equiv \begin{bmatrix} C[0] & C[1] & \dots & C[L-1] & 0 & \dots & 0 \\ 0 & C[0] & C[1] & \dots & C[L-1] & 0 & \vdots \\ \vdots & \vdots & \vdots & \vdots & \vdots & \vdots & \vdots \\ \vdots & 0 & C[0] & C[1] & \dots & C[L-1] & 0 \\ 0 & \dots & 0 & C[0] & C[1] & \dots & C[L-1] \end{bmatrix} \quad (2)$$

is an $(M+1)\times(L+M)$ block Toeplitz matrix of block size $N_r \times N_r$. The "square-root" of the matrix may be computed by well-known algorithms such as the Cholesky decomposition or the eigen-decomposition. In this embodiment, the size of the matrix $\hat{F}$ is $(M+1)N_r$ by $(M+1)N_r$.

At step 14, a whitened received signal $\hat{y}[n]$ and whitened training symbol $\hat{t}[n]$ are generated utilizing the equations:

$$\hat{y}[n] = \hat{F}r^{M+1}[n] \text{ and } \hat{t}[n] = \hat{F}(S_M^T[n] \otimes I_{N_r}) \quad (3)$$

where $\otimes$ denotes the Kronecker product, $I_N$, denotes an $N_r \times N_r$ identity matrix, and $S_M \equiv [s^L[n], s^L[n-1], \ldots, s^L[n-M]]$.

At step 15, the synchronization position $n_0$ is found based on the whitened signal $\hat{y}[n]$ and whitened training symbol $\hat{t}[n]$ by:

$$\hat{n}_0 = \underset{n_0 \in \Pi}{\operatorname{argmin}} \left\{ \sum_{n=L+M-1}^{N-1} \|\hat{y}[n+n_0]\|^2 - \left( \sum_{n=L+M-1}^{N-1} \hat{t}[n]^H \hat{y}[n+n_0] \right)^H \left( \sum_{n=L+M-1}^{N-1} \hat{t}[n]^H \hat{t}[n] \right)^{-1} \left( \sum_{n=L+M-1}^{N-1} \hat{t}[n]^H \hat{y}[n+n_0] \right) \right\} \quad (4)$$

At step 16, the channel estimate $\hat{C}$ is computed for a fixed synchronization position $n_0$ based on the whitened signal $\hat{y}[n]$ and whitened training sequence $\hat{t}[n]$ by:

$$vec(\hat{C}) = \left( \sum_{n=L+M-1}^{N-1} \hat{t}[n]^H \hat{t}[n] \right)^{-1} \left( \sum_{n=L+M-1}^{N-1} \hat{t}[n]^H \hat{y}[n+\hat{n}_0] \right). \quad (5)$$

At step 17, it is determined whether a predefined stopping criterion has been met. The stopping criterion may be based on a predefined fixed number of iterations, or on a determination that the percentage change in a quantity is below (or above) a predefined threshold. The quantity may be, for example, the channel estimation error given by $$E(\hat{C}, \hat{\Lambda}, \hat{n}_0) = \sum_{n=L+M-1}^{N-1} \left( r^{M+1}[n+\hat{n}_0] - T(\hat{C})s^{L+M}[n] \right)^H$$
$$\hat{\Lambda}^{-1} \left( r^{M+1}[n+\hat{n}_0] - T(\hat{C})s^{L+M}[n] \right).$$

or the log likelihood function given by:

$$LL(\hat{C}, \hat{\Lambda}, \hat{n}_0) =$$
$$-(N-L-M+1)\log\det\hat{\Lambda} - \sum_{n=L+M-1}^{N-1} \left( r^{M+1}[n+\hat{n}_0] - T(\hat{C})s^{L+M}[n] \right)^H$$
$$\hat{\Lambda}^{-1} \left( r^{M+1}[n+\hat{n}_0] - T(\hat{C})s^{L+M}[n] \right).$$

If the stopping criterion has not been met, the process returns to step 13 and performs another iteration. If the stopping criterion has been met, the process stops at step 18.

In an alternative embodiment, which has lower computational complexity, the whitening filter estimate $\hat{F}$ in step 13 may be computed by solving the following system of equations using the WWRA algorithm.

$$\hat{F} \begin{bmatrix} R_v[0] & R_v[1] & \dots & R_v[M] \\ R_v[-1] & R_v[0] & R_v[1] & \vdots \\ \vdots & R_v[-1] & \ddots & R_v[1] \\ R_v[-M] & \dots & R_v[-1] & R_v[0] \end{bmatrix} = [I_{N_r}, 0_{N_r,(M+1)N_r}]$$

where $0_{N_r,(M+1)N_r}$ denotes a $N_r \times (M+1)N_r$ all zero matrix, and $$R_v[m] \equiv \sum_{n=L+M-1}^{N-1} \left( r[n] - \hat{C}s^L[n] \right)\left( r[n] - \hat{C}s^L[n] \right)^H.$$

In this embodiment, the size of the matrix $\hat{F}$ is $N_r$ by $(M+1)N_r$.

Figure 2:
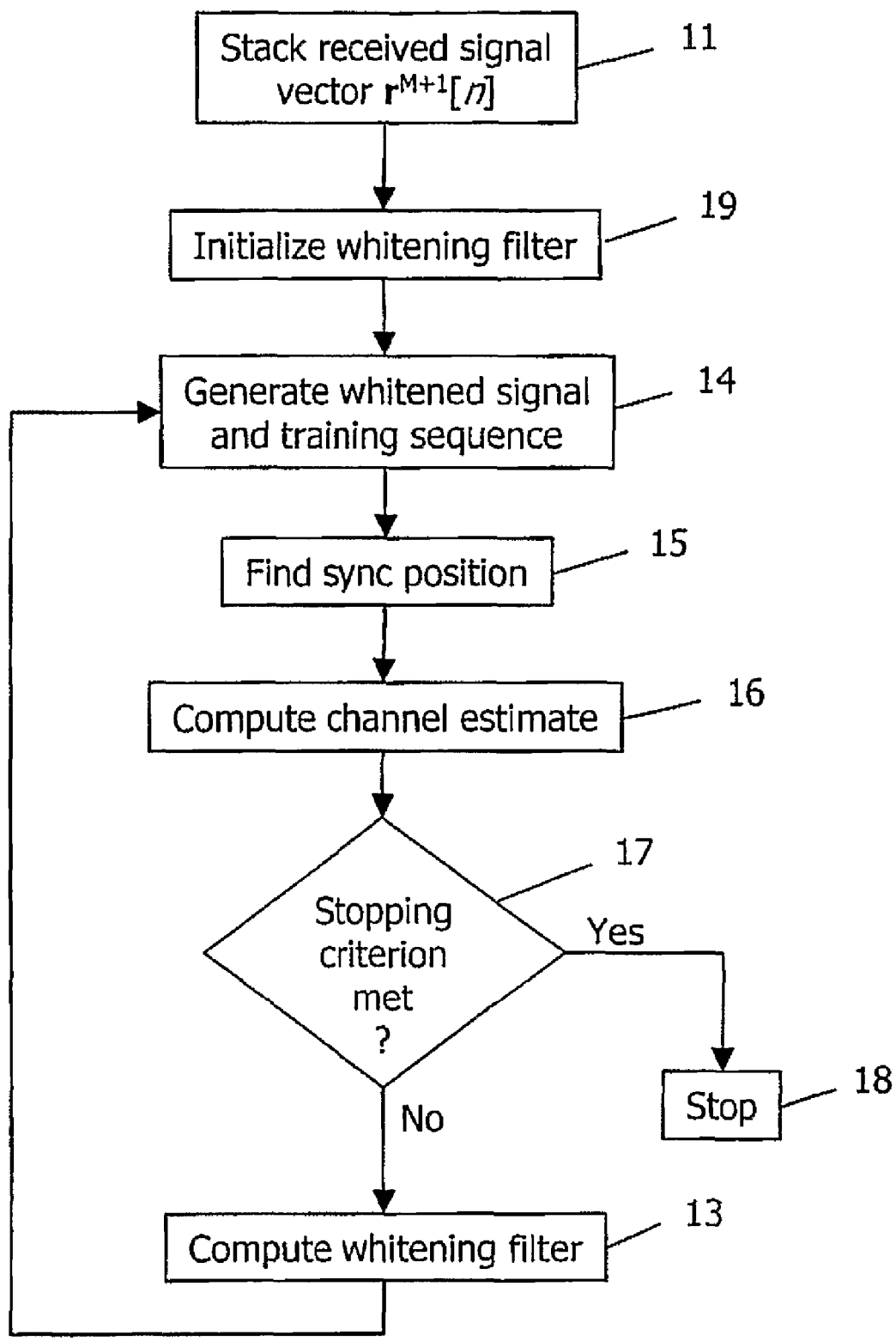
FIG. 2 is a flow chart of a second embodiment of the method of the present invention.

FIG. 2 is a flow chart of a second embodiment of the method of the present invention in which the order of iteration $F \rightarrow n_0 \rightarrow C$ is utilized. Similar steps are numbered the same in all figures. In this embodiment, the iteration starts with an initial estimate of the whitening filter F, followed by a first computation of the synchronization position $n_0$ and the channel estimate C. At step 11, a stacked received signal vector $r^{M+1}[n]$ is generated. At step 19, the whitening filter is initialized. At step 14, a whitened received signal $\hat{y}[n]$ and whitened training symbol $\hat{t}[n]$ are generated using the procedures described above. At step 15, the synchronization position $n_0$ is found based on the whitened signal $\hat{y}[n]$ and whitened training symbol $\hat{t}[n]$. At step 16, the channel estimate $\hat{C}$ is computed for the found synchronization position $\hat{n}_0$ based on the whitened signal $\hat{y}[n]$ and whitened training sequence $\hat{t}[n]$.

At step 17, it is determined whether a predefined stopping criterion has been met. Once again, the stopping criterion may be based on a predefined fixed number of iterations, or a determination that the percentage change in a quantity, such as the channel estimation error, $E(\hat{C},\hat{\Lambda},\hat{n}_0)$, or the log likelihood function, $LL(\hat{C},\hat{\Lambda},\hat{n}_0)$, is below (or above) a predefined threshold. If the stopping criterion has been met, the process stops at step 18. If the stopping criterion has not been met, the process moves to step 13 and computes the whitening filter $\hat{F}$. The process then returns to step 14 and performs another iteration.

Figure 3:
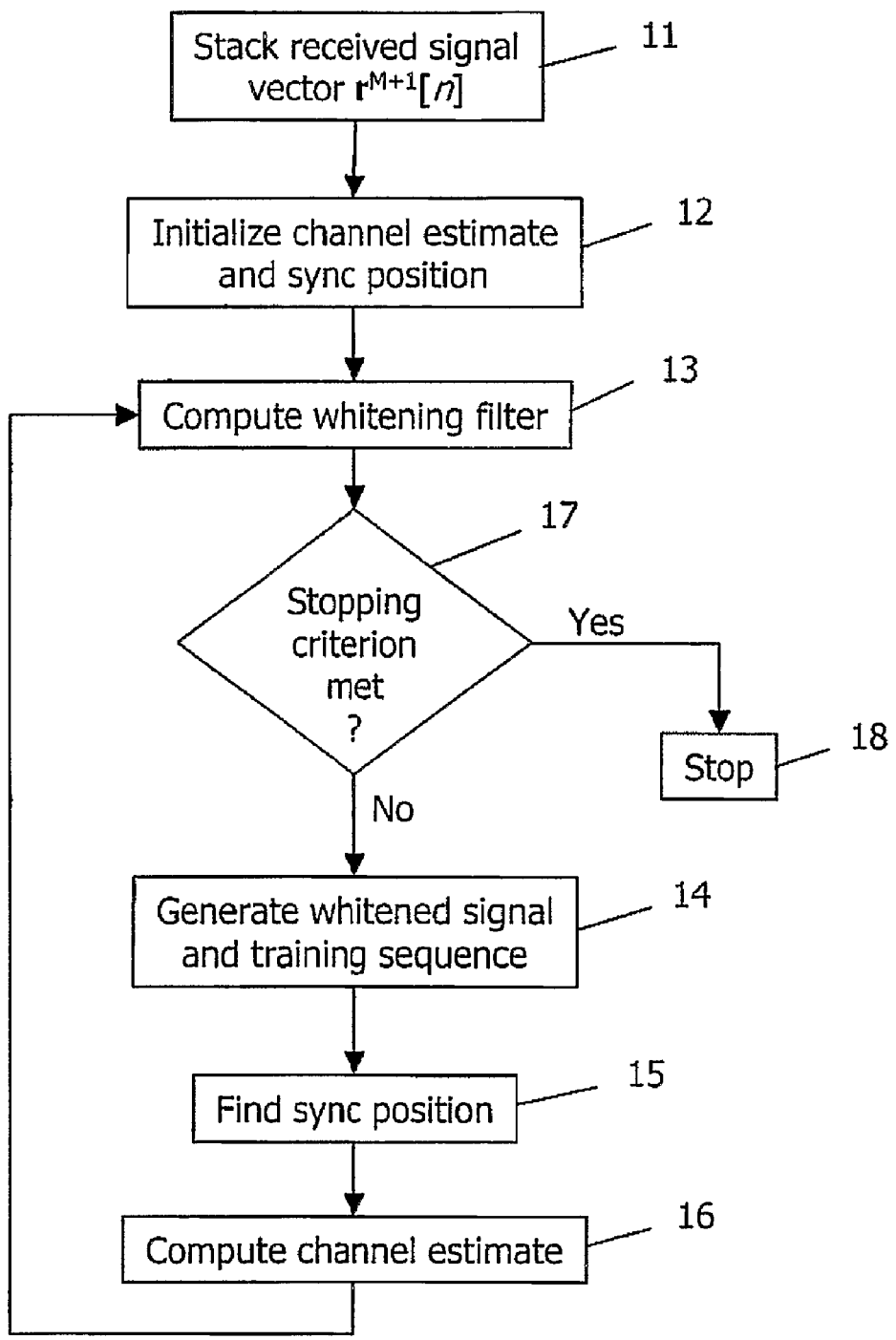
FIG. 3 is a flow chart of a third embodiment of the method of the present invention.

FIG. 3 is a flow chart of a third embodiment of the method of the present invention in which the order of iteration F→$n_0$→C is utilized. Again, similar steps are numbered the same in all figures. In this embodiment, the iteration starts with an initial estimate of C and $n_0$, followed by a first computation of the whitening filter F. At step 11, a stacked received signal vector $r^{M+1}[n]$ is generated. At step 12, the channel estimate C and the synchronization position $n_0$ are initialized. At step 13, the whitening filter $\hat{F}$ is computed in a first iteration based on the fixed values of the channel estimate C and the synchronization position $n_0$.

At step 17, it is determined whether a predefined stopping criterion has been met. Once again, the stopping criterion may be based on a predefined fixed number of iterations, or a determination that the percentage change in a quantity, such as the channel estimation error, $E(\hat{C},\hat{\Lambda},\hat{n}_0)$, or the log likelihood function, $LL(\hat{C},\hat{\Lambda},\hat{n}_0)$, is below (or above) a predefined threshold. If the initial channel estimate is known to be accurate (for example, a joint channel estimate), it may not be desirable to re-estimate it. Therefore, in this embodiment, the process may stop at step 18 after computing the whitening filter. If the stopping criterion has not been met, the process moves to step 14 where a whitened received signal $\hat{y}[n]$ and whitened training symbol $\hat{t}[n]$ are generated using the procedures described above. At step 15, the synchronization position $n_0$ is found based on the whitened signal $\hat{y}[n]$ and whitened training symbol $\hat{t}[n]$. At step 16, the channel estimate $\hat{C}$ is computed for the found synchronization position $\hat{n}_0$ based on the whitened signal $\hat{y}[n]$ and whitened training sequence $\hat{t}[n]$. The process then returns to step 13, where the whitening filter $\hat{F}$ is computed in a second iteration prior to determining again at step 17 whether the predefined stopping criterion has been met. If the stopping criterion has been met, the process stops at step 18. Otherwise, the process continues with another iteration.

Figure 4:
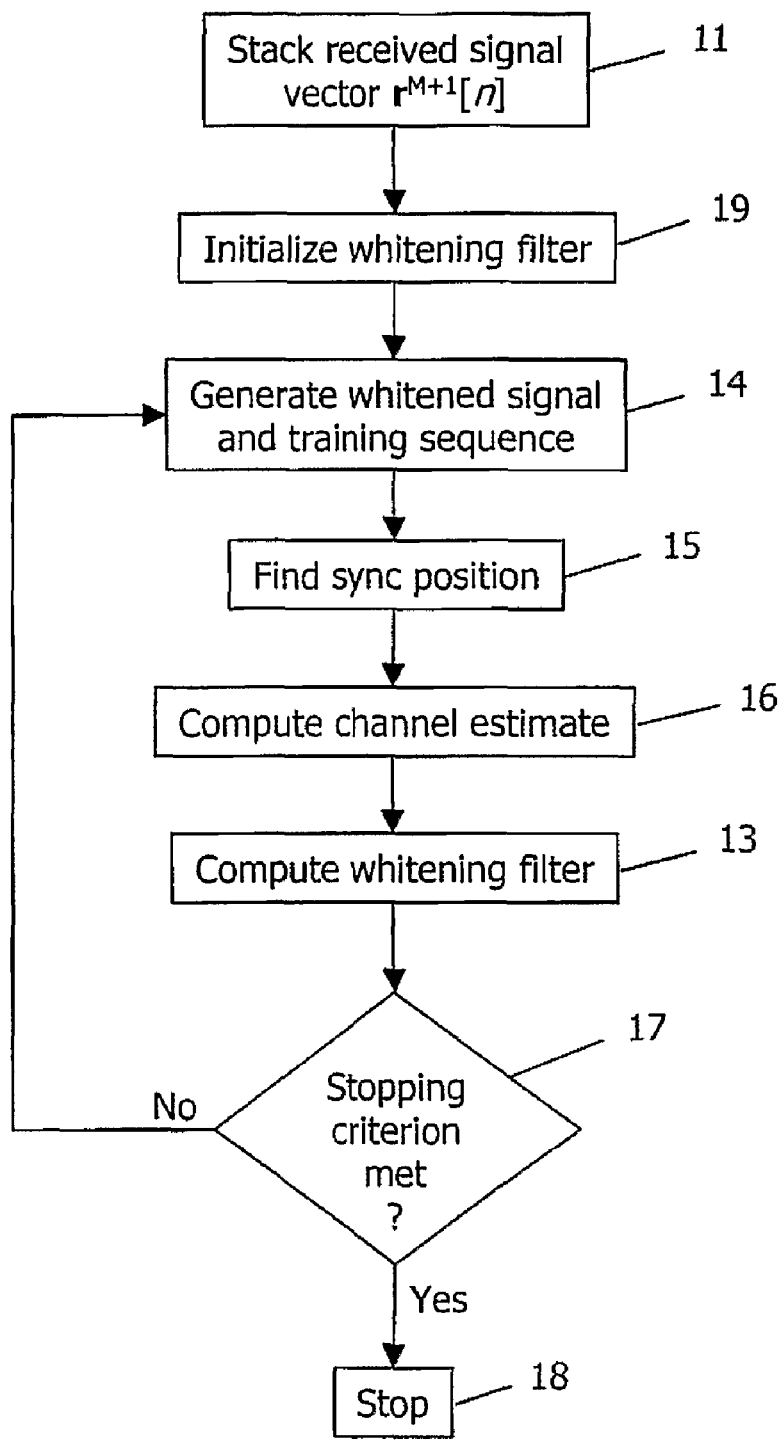
FIG. 4 is a flow chart of a fourth embodiment of the method of the present invention.

FIG. 4 is a flow chart of a fourth embodiment of the method of the present invention in which the order of iteration F→$n_0$→C is utilized. Again, similar steps are numbered the same in all figures. In this embodiment, the iteration starts with an initial estimate of the whitening filter F, followed by a first computation of the synchronization position $n_0$ and the channel estimate C. At step 11, a stacked received signal vector $r^{M+1}[n]$ is generated. At step 19, the whitening filter is initialized. At step 14, a whitened received signal $\hat{y}[n]$ and whitened training symbol $\hat{t}[n]$ are generated using the procedures described above. At step 15, the synchronization position $n_0$ is found based on the whitened signal $\hat{y}[n]$ and whitened training symbol $\hat{t}[n]$. At step 16, the channel estimate $\hat{C}$ is computed for the found synchronization position $\hat{n}_0$ based on the whitened signal $\hat{y}[n]$ and whitened training sequence $\hat{t}[n]$. At step 13, the whitening filter $\hat{F}$ is computed based on the values of the channel estimate C and the synchronization position $n_0$.

At step 17, it is determined whether a predefined stopping criterion has been met. Once again, the stopping criterion may be based on a predefined fixed number of iterations, or a determination that the percentage change in a quantity, such as the channel estimation error, $E(\hat{C},\hat{\Lambda},\hat{n}_0)$, or the log likelihood function, $LL(\hat{C},\hat{\Lambda},\hat{n}_0)$, is below (or above) a predefined threshold. If the stopping criterion has been met, the process stops at step 18. If the stopping criterion has not been met, the process returns to step 14 and performs another iteration.

Figure 5:
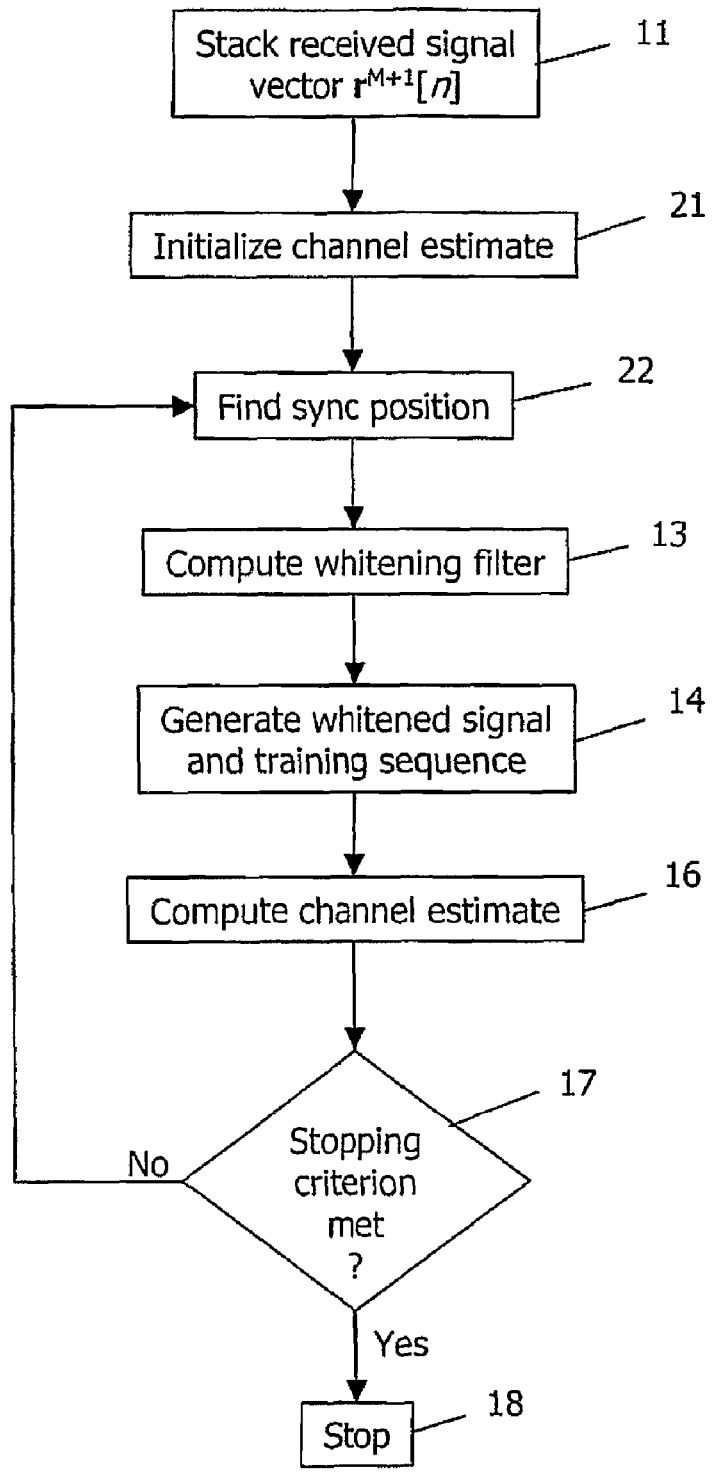
FIG. 5 is a flow chart of a fifth embodiment of the method of the present invention.

FIG. 5 is a flow chart of a fifth embodiment of the method of the present invention in which the order of iteration $n_0$→F→C is utilized. Again, similar steps are numbered the same in all figures. In this embodiment, the iteration starts with an initial estimate of C, followed by a first computation of the synchronization position $n_0$ and the whitening filter F. At step 11, a stacked received signal vector $r^{M+1}[n]$ is generated. At step 21, the channel estimate is initialized. The initial channel estimate may be computed using the conventional LS channel estimate, or other algorithms that exploit other known information about the received signal, such as the knowledge of pulse-shaping filter, the knowledge of the interferer's training sequence, and the like. At step 22, a best synchronization position $\hat{n}_0$ is found based on a fixed channel estimate $\hat{C}$ by:

$$\hat{n}_0 = \underset{n_0 \in \Pi}{\operatorname{argmin}} \det\left[\sum_{n=L+M-1}^{N-1} \left(r^{M+1}[n+n_0] - T(\hat{C})s^{L+M}[n]\right) \left(r^{M+1}[n+n_0] - T(\hat{C})s^{L+M}[n]\right)^H\right]. \quad (7)$$

At step 13, the process computes an estimate of the whitening filter $\hat{F}$ for a fixed channel estimate $\hat{C}$ and fixed sync position $\hat{n}_0$ by computing the "square root" of the matrix $\hat{\Lambda}$ such that $\hat{F}^H\hat{F}=\hat{\Lambda}^{-1}$, where $\hat{\Lambda}$ is defined in equation (1). At step 14, the process computes a whitened received signal $\hat{y}[n]$ and whitened training symbol $\hat{t}[n]$ using equation (2). At step 16, the process computes a channel estimate $\hat{C}$ for a fixed sync position $\hat{n}_0$ based on the whitened signal $\hat{y}[n]$ and whitened training sequence $\hat{t}[n]$ using equation (4).

At step 17, it is determined whether a predefined stopping criterion has been met. Once again, the stopping criterion may be based on a predefined fixed number of iterations, or a determination that the percentage change in a quantity, such as the channel estimation error, $E(\hat{C},\hat{\Lambda},\hat{n}_0)$, or the log likelihood function, $LL(\hat{C},\hat{\Lambda},\hat{n}_0)$, is below (or above) a predefined threshold. If the stopping criterion has been met, the process stops at step 18. If the stopping criterion has not been met, the process returns to step 22 and performs another iteration.

Figure 6:
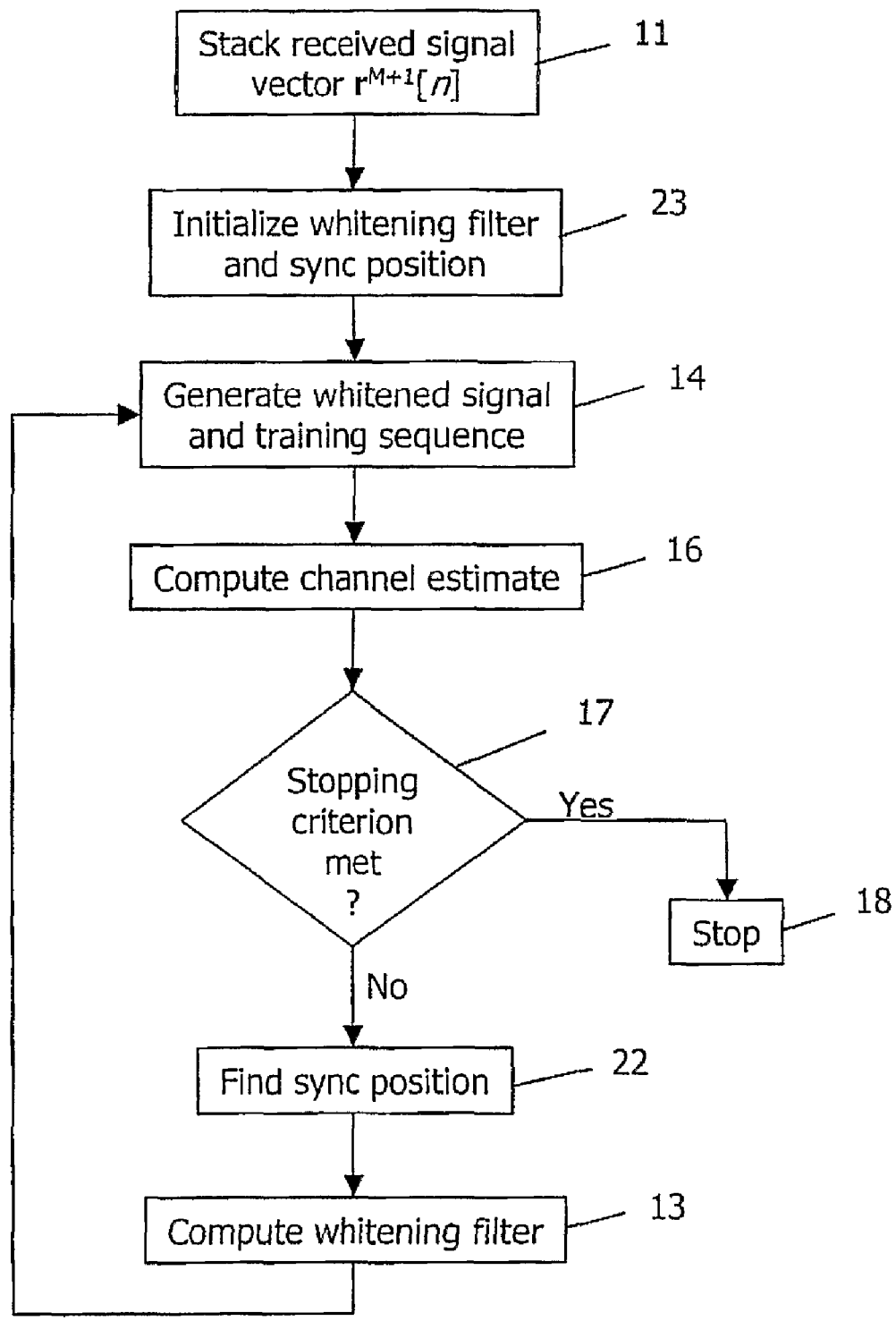
FIG. 6 is a flow chart of a sixth embodiment of the method of the present invention.

FIG. 6 is a flow chart of a sixth embodiment of the method of the present invention in which the order of iteration $n_0$→F→C is utilized. Again, similar steps are numbered the same in all figures. In this embodiment, the iteration starts with an initial estimate of the whitening filter F and the synchronization position $n_0$, followed by a first computation of the channel estimate C. At step 11, a stacked received signal vector $r^{M+1}[n]$ is generated. At step 23, the whitening filter and the synchronization position are initialized. At step 14, the process computes a whitened received signal $\hat{y}[n]$ and whitened training symbol $\hat{t}[n]$ using equation (2). At step 16, the process computes the channel estimate $\hat{C}$ for a fixed sync position $\hat{n}_0$ based on the whitened signal $\hat{y}[n]$ and whitened training sequence $\hat{t}[n]$ using equation (4).

At step 17, it is determined whether a predefined stopping criterion has been met. Once again, the stopping criterion may be based on a predefined fixed number of iterations, or a determination that the percentage change in a quantity, such as the channel estimation error, $E(\hat{C},\hat{\Lambda},\hat{n}_0)$, or the log likelihood function, $LL(\hat{C},\hat{\Lambda},\hat{n}_0)$, is below (or above) a predefined threshold. If the stopping criterion has been met, the process stops at step 18. If the stopping criterion has not been met, the process moves to step 22, where the best synchronization position $\hat{n}_0$ is found based on the channel estimate $\hat{C}$ using equation (7). At step 13, the process computes an estimate of the whitening filter $\hat{F}$ for a fixed channel estimate $\hat{C}$ and fixed sync position $\hat{n}_0$ by computing the "square root" of the matrix $\hat{\Lambda}$ such that $\hat{F}^H\hat{F}=\hat{\Lambda}^{-1}$, where $\hat{\Lambda}$ is defined in equation (1). The process then repeats steps 14 and 16 prior to determining once again whether the stopping criterion has been met.

Figure 7:
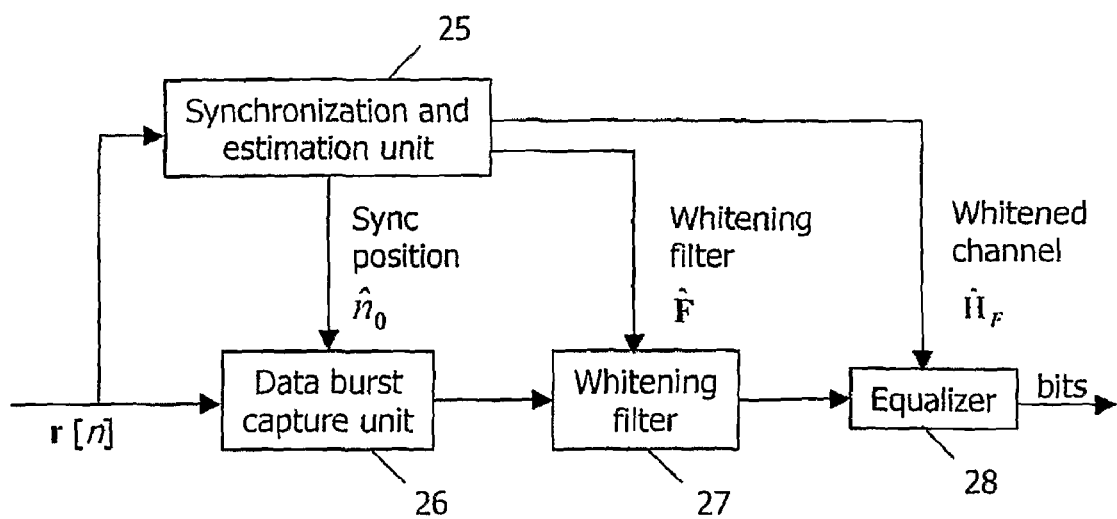
FIG. 7 is a simplified functional block diagram of an embodiment of the device of the present invention.

FIG. 7 is a simplified functional block diagram of an embodiment of the system of the present invention. In FIG. 7, a synchronization and estimation unit 25, functioning in accordance with the teachings of the present invention, is implemented in a radio receiver. A received signal r[n] is provided to the synchronization and estimation unit. The synchronization and estimation unit finds the synchronization position $\hat{n}_0$ and provides it to a data burst capture unit 26, thus enabling the demodulator or equalizer 28 of the receiver to synchronize to the beginning of the data burst. The synchronization and estimation unit also provides whitening filter parameters $\hat{F}$ for a whitening filter 27. An estimate of a certain spectral property of the noise, such as the noise covariance matrix $\hat{\Lambda}$, is utilized to derive the whitening filter 27 for whitening, and therefore suppressing, the noise. Finally, the synchronization and estimation unit provides an estimate $\hat{H}_F$ of the whitened channel to the equalizer 28.

In a preferred embodiment, the equalizer 28 may include a combining prefilter, such as that described in U.S. patent application Ser. No. 10/889,641 entitled, "An Efficient Method of Implementing Equalizers in Multiple-Antenna Wireless Receivers." The combining prefilter reduces implementation complexity by combining multiple signal branches coming from the whitening filter 27 into fewer branches. The prefilter coefficients are computed based on the whitened channel estimate $\hat{H}_F$ generated by the synchronization and estimation unit. The prefilter is followed by a reduced-complexity sequence detector, such as a Decision-Feedback Sequence Estimation (DFSE) detector, which may provide hard or soft estimates of the transmitted data bits. Alternatively, the prefilter may be implemented as a separate prefilter between the whitening filter 27 and the equalizer 28.

The present invention provides an additional advantage for single antenna interference cancellation (SAIC) in GSM/EDGE cellular systems. The present invention can be used to achieve SAIC-type interference rejection for synchronization and channel estimation in the 8PSK mode of transmission to suppress an 8PSK co-channel interferer in an almost-synchronized network. In comparison, the conventional method of estimating the whitened channel is only beneficial for the GMSK mode. In the 8PSK mode, however, the training period is GMSK modulated while the payload period is 8PSK modulated. Therefore, different types of whitening filters (IQ-type for the training period and pure-temporal-type for the payload period) should be used in the training and payload period of each burst to achieve the best possible gain. A whitened channel estimate obtained over the training period, which may have combined a SAIC-type whitening filter with the original channel, cannot be applied directly for demodulation or equalization of the payload. However, the non-whitened channel, as obtained according to the present invention, can be used for the payload period of the burst, because the non-whitened channel is independent of the whitening filter used to suppress interference over the training period.

Justification:

Rewriting the signal model in equation (1) by stacking (M+1) temporally adjacent received vectors, the following signal model is obtained:

$$r^{M+1}[n+n_0] = T(C)s^{L+M}[n] + v^{M+1}[n], \quad (8)$$

where T(C) is defined in equation (6). A key model assumption is that the (expanded) noise vector process $\{v^{M+1}[n]\}$ is IID, and let $\Lambda \equiv E[v^{M+1}[n](v^{M+1}[n])^H]$ be the covariance matrix of $v^{M+1}[n]$. Then, the maximum-likelihood joint estimate of (C, $\Lambda$, $n_0$) is given by:

$$(\hat{C}_{Ml}, \hat{\Lambda}_{ML}, \hat{n}_0^{ML}) = \underset{(C,\Lambda,n_0)}{\mathrm{argmax}}\, p(\{r^{M+1}[n+n_0]\}_{n=L+M-1}^{N-1} \mid C, \Lambda, n_0)$$

$$= \underset{(C,\Lambda,n_0)}{\mathrm{argmax}}\, LL(C, \Lambda, n_0)$$

where LL(C,$\Lambda$,$n_0$) is the log likelihood function given by:

$$LL(C, \Lambda, n_0) \equiv \log p(\{r^{M+1}[n+n_0]\}_{n=L+M-1}^{N-1} \mid C, \Lambda, n_0) \quad (6)$$

$$= -(N - L - M + 1)\log\det\Lambda - \sum_{n=L+M-1}^{N-1}$$

$$(r^{M+1}[n+n_0] - T(C)s^{L+M}[n])^H \Lambda^{-1}$$

$$(r^{M+1}[n+n_0] - T(C)s^{L+M}[n]).$$

Unfortunately, there is no close-form expression for this joint estimate, and the present invention takes an iterative approach to compute such joint estimate. Since the problem originates from the fact that there is no close-form expression for the joint estimate for C and $\Lambda$, two iterative algorithms are proposed. The first algorithm corresponds to embodiments 1-4, and the second algorithm corresponds to embodiments 5-6 of the present invention. The first algorithm begins with the computation of an estimate of $\Lambda$ followed by the computation of the joint estimate of (C,$n_0$) for a given $\Lambda$. The second algorithm first computes the joint estimate of ($\Lambda$,$n_0$), followed by the computation of an estimate of C for a given $\Lambda$ and $n_0$. The following is a derivation of the first algorithm.

Best $\Lambda$ for a Fixed C and a Fixed $n_0$:

Define $\log A \equiv \sum_{i=1}^{n_A} (\log \lambda_i) q_i q_i^H$ for any Hermitian symmetric positive definite matrix A, where $n_A$ denotes the dimension of A, $\{\lambda_i\}$ and $\{q_i\}$ are the eigenvalues and eigenvectors of A, respectively. Using the identity log detA=tr(log A), the log likelihood function in equation (9) can be rewritten as:

$$LL(C, \Lambda, n_0) = (N - L - M + 1)tr(\log\Lambda^{-1} - \Lambda^{-1}R_e)$$

$$= (N - L - M + 1)tr(\log\Lambda^{-1}R_e - \Lambda^{-1}R_e - \log R_e)$$

$$\leq (N - L - M + 1)tr(-I_{(M+1)N_r} - \log R_e)$$

where $$R_e \equiv \frac{1}{N-L-M+1} \sum_{n=L+M-1}^{N-1} \begin{pmatrix} r^{M+1}[n+n_0] - \\ T(C)s^{L+M}[n] \end{pmatrix} \begin{pmatrix} r^{M+1}[n+n_0] - \\ T(C)s^{L+M}[n] \end{pmatrix}^H$$

and where the inequality above follows from the matrix identity $\log A \leq A-I$ for any Hermitian positive-definite matrix A. Note that the inequality becomes equality (in which case the log likelihood function is maximized) if and only if $\Lambda^{-1}R_e = I_{(M+1)N_r}$, or equivalently $\Lambda = R_e$. By neglecting the normalization constant $(N-L-M+1)^{-1}$, it follows that the best $\hat{\Lambda}$ for a given C and $n_0$, is:

$$\hat{\Lambda}(C, n_0) = \sum_{n=L+M-1}^{N-1} \left( \begin{array}{c} r^{M+1}[n+n_0] - \\ T(C)s^{L+M}[n] \end{array} \right) \left( \begin{array}{c} r^{M+1}[n+n_0] - \\ T(C)s^{L+M}[n] \end{array} \right), \quad (10)$$

which leads to equation (1).
Best C for a Fixed $\Lambda$ and a Fixed $n_0$:

First, we note that the signal model in equation (8) can be rewritten as:

$$r^{M+1}[n+n_0] = vec([r[n+n_0], r[n+n_0-1], \ldots, r[n+n_0-M]])$$
$$= vec(CS_M[n] + [v[n], v[n-1], \ldots, v[n-M]])$$
$$= vec(CS_M[n]) + v^{M+1}[n]$$

where the matrix identity $vec(XYZ)=(Z^T \otimes X)vec(Y)$, for any matrices X, Y and Z, is used in the last equality. Now let $F^H F=\Lambda^{-1}$. It follows that the log likelihood function in equation (9) can be written as:

$$LL(C, \Lambda, n_0) = -(N-L-M+1)\log\det\Lambda - \quad (12)$$
$$\sum_{n=L+M-1}^{N-1} \left( \begin{array}{c} r^{M+1}[n+n_0] - \\ (S_M^T[n] \otimes I_{(M+1)N_r})vec(C) \end{array} \right)^H$$
$$\Lambda^{-1}(r^{M+1}[n+n_0] - (S_M^T[n] \otimes I_{(M+1)N_r})vec(C)).$$
$$= -(N-L-M+1)\log\det\Lambda -$$
$$\sum_{n=L+M-1}^{N-1} \left\| F \left( \begin{array}{c} r^{M+1}[n+n_0] - \\ (S_M^T[n] \otimes I_{(M+1)N_r})vec(C) \end{array} \right) \right\|^2$$
$$= -(N-L-M+1)\log\det\Lambda -$$
$$\sum_{n=L+M-1}^{N-1} \left\| \begin{array}{c} y[n+n_0] - \\ t[n]vec(C) \end{array} \right\|^2.$$

where $y[n] \equiv Fr^{M-1}[n]$ and $t[n] \equiv F(S_M^T[n] \otimes I_{(M+1)N_r})$, similar to equation (2). For a fixed $\Lambda$ and $n_0$, the first term in equation (12) can be neglected in the search of the best C. It follows that:

$$\hat{C}(\Lambda, n_0) \equiv \underset{C}{\text{argmax}} \ LL(C, \Lambda, n_0) =$$
$$\underset{C}{\text{argmin}} \sum_{n=L+M-1}^{N-1} \|y[n+n_0] - t[n]vec(C)\|^2,$$

which is a simple least-squares problem, and hence $$vec(\hat{C}(\Lambda, n_0)) = \left( \sum_{n=L+M-1}^{N-1} t[n]^H t[n] \right)^{-1} \left( \sum_{n=L+M-1}^{N-1} t[n]^H y[n+n_0] \right), \quad (13)$$

which leads to equation (4).
Best $(n_0, C)$ for a fixed $\Lambda$:

By substituting equation (13) into equation (12), the best $n_0$ for a fixed $\Lambda$ is given by:

$$\hat{n}_0(\Lambda) = \underset{n_0 \in \Pi}{\text{argmax}} \max_{C} LL(C, \Lambda, n_0)$$
$$= \underset{n_0 \in \Pi}{\text{argmax}} LL(\hat{C}(\Lambda, n_0), \Lambda, n_0)$$
$$= \underset{n_0 \in \Pi}{\text{argmin}} \left\{ \sum_{n=L+M-1}^{N-1} \|y[n+n_0]\|^2 - \left( \sum_{n=L+M-1}^{N-1} t[n]^H y[n+n_0] \right)^H \right. $$
$$\left. \left( \sum_{n=L+M-1}^{N-1} t[n]^H t[n] \right)^{-1} \left( \sum_{n=L+M-1}^{N-1} t[n]^H y[n+n_0] \right) \right\}$$

which leads to equation (3). The corresponding best C for a fixed $\Lambda$ is simply given by $\hat{C}(\Lambda, \hat{n}_0(\Lambda))$, which can be computed using equation (13).

Best $(n_0, \Lambda)$ for a fixed C:

Most of the steps in the second iterative algorithm are the same as the first algorithm, except for the step of finding the best synchronization position $n_0$ based on a fixed channel estimate C. By substituting equation (10) into equation (12), the best $n_0$ for a fixed C is given by:

$$\hat{n}_0(C) = \underset{n_0 \in \Pi}{\text{argmax}} \max_{\Lambda} LL(C, \Lambda, n_0)$$
$$= \underset{n_0 \in \Pi}{\text{argmax}} LL(C, \hat{\Lambda}(C, n_0), n_0)$$
$$= \underset{n_0 \in \Pi}{\text{argmin}} \log\det\hat{\Lambda}(C, n_0)$$

which leads to equation (7). The corresponding best $\Lambda$ for a fixed C is simply given by $\hat{\Lambda}(C, \hat{n}_0(C))$, which can be computed using equation (10).

Figure 8:
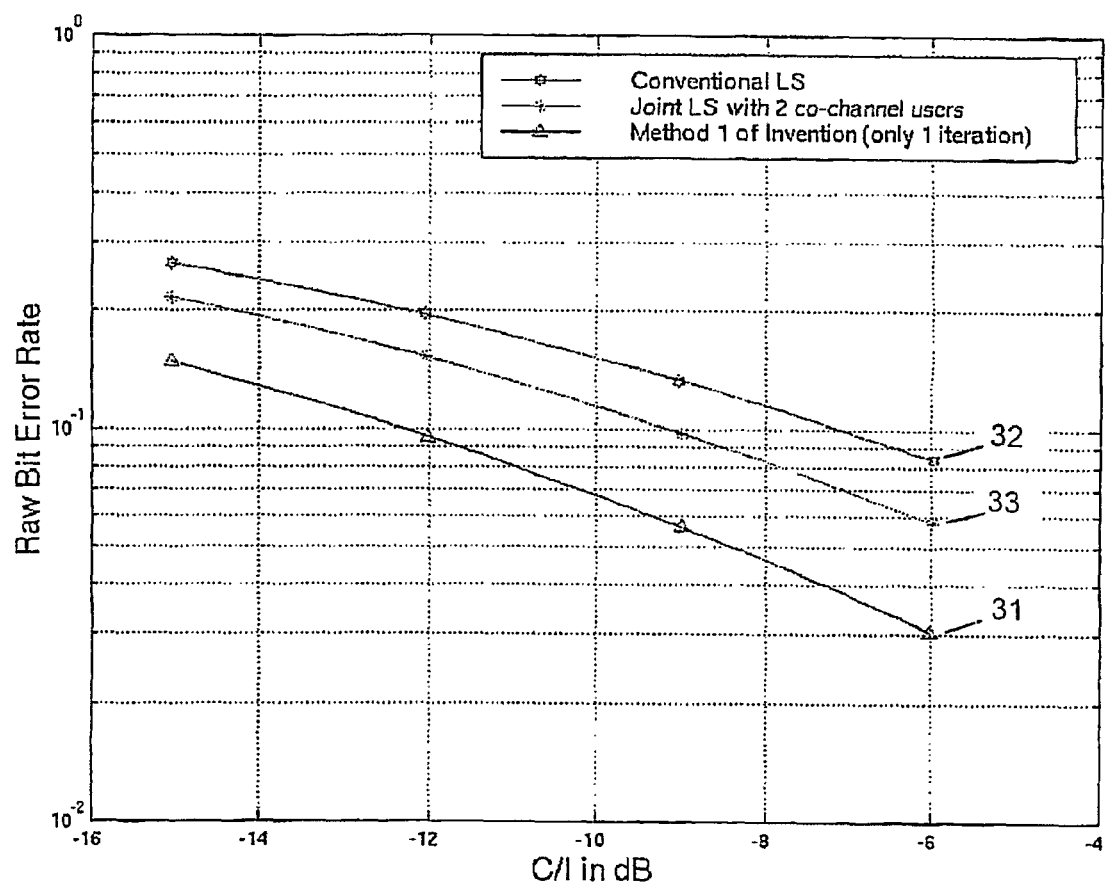
FIG. 8 is a graph of raw bit error rate as a function of carrier-to-interference (C/I) ratio, comparing the performance of the first algorithm of the present invention with conventional estimation methodologies.

FIG. 8 is a graph of raw bit error rate as a function of carrier-to-interference (C/I) ratio, comparing the performance of the first algorithm of the present invention with conventional estimation methodologies. More particularly, FIG. 8 compares the performance of a single iteration of the first algorithm of the present invention 31 with the conventional LS channel estimation method 32 and the joint LS channel estimation method 33 in a test case in which there are two users, namely the desired user and a dominant co-channel interferer. The underlying cellular network is assumed to be approximately synchronized, and the interferer is assumed to have a valid GSM training sequence in each burst. The receiver uses the odd and even phases of a 2-time over-sampled received signal, along with the signal's I and Q components, to form a 4-branch received signal (i.e. $N_r=4$ and $N_t=1$). Different synchronization and channel estimation schemes are compared with the same equalizer, which is a decision-feedback sequence estimation (DFSE) equalizer, and which is preceded by a multi-input-single-output (MISO) prefilter and a spatial-temporal whitening filter.

As shown in FIG. 8, the performance of a receiver that employs the invention is approximately 5 dB better than a receiver that uses the conventional LS synchronization and channel estimation. The invention also outperforms the joint LS synchronization and channel estimation (which uses a priori information about the existence of the interferer's training sequence) by more than 3 dB in this scenario.

Figure 9:
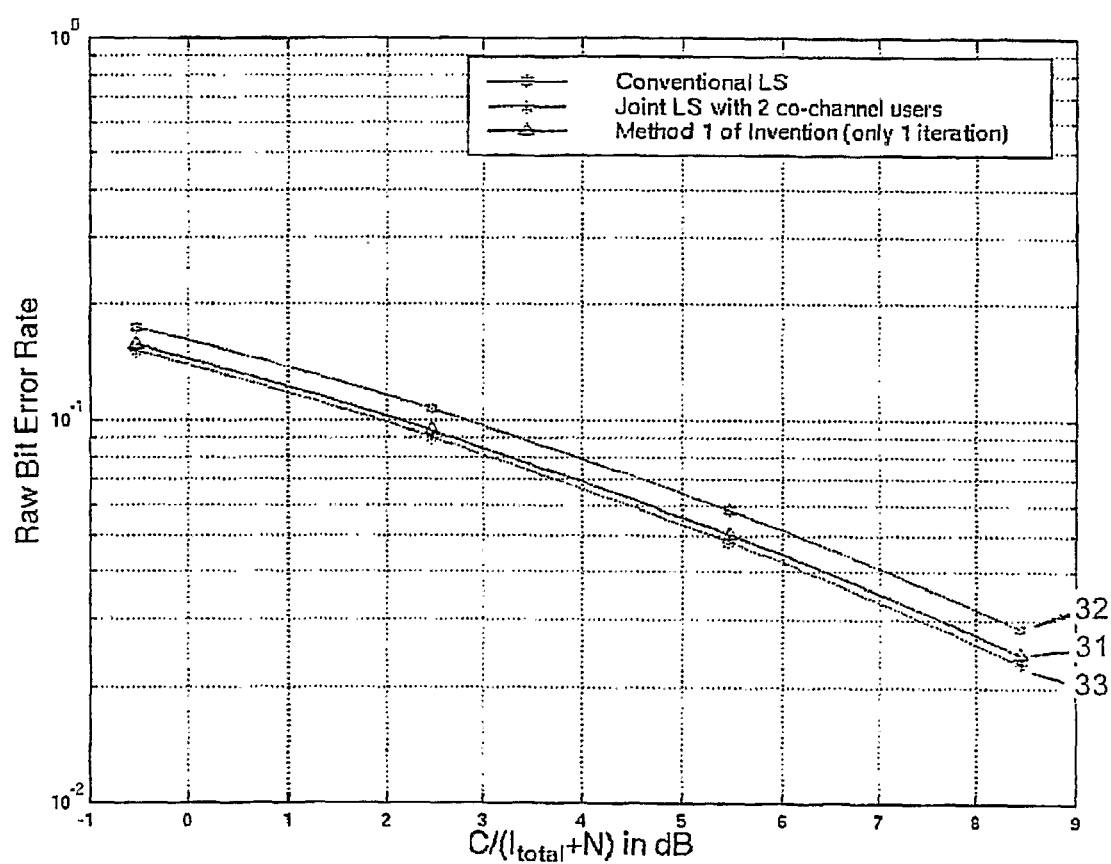
FIG. 9 is a graph of raw bit error rate as a function of carrier-to-total interference plus noise (C/I$_{total}$+N) with multiple co-channel interferers and additive white Gaussian noise, comparing the invention with conventional estimation methodologies.

FIG. 9 is a graph of raw bit error rate as a function of carrier-to-total interference plus noise ($C/I_{total}+N$) with multiple co-channel interferers and additive white Gaussian noise, comparing the invention with conventional estimation methodologies. More particularly, FIG. 9 compares the performance of a single iteration of the first algorithm of the present invention 31 with the conventional LS channel estimation method 32 and the joint LS channel estimation method 33 in a test case in which there are two co-channel interferers with 10 dB difference in average power between them, an adjacent channel interferer whose power (before receiver filtering) is 3 dB higher than the stronger co-channel interferer, and some additive white Gaussian noise. The underlying cellular network is again assumed to be approximately synchronized, and each interferer is assumed to have a valid GSM training sequence in each burst. The receiver again uses the odd and even phases of a 2-time oversampled received signal, along with the signal's I and Q components, to form a 4-branch received signal (i.e. $N_r=4$ and $N_t=1$). Different synchronization and channel estimation schemes are compared with the same equalizer, which is a decision-feedback sequence estimation (DFSE) equalizer, and which is preceded by a multi-input-single-output (MISO) prefilter and a spatial-temporal whitening filter.

As shown in FIG. 9, the present invention provides a gain of approximately 0.7 dB over the conventional LS channel estimation method in this scenario. The performance of the invention in this scenario is within 0.2 dB from that of the joint LS synchronization and channel estimation.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

What is claimed is:

1. A method in a radio receiver of generating synchronization and channel estimation information for a received signal, said method comprising the steps of:
   generating a spatially and temporally stacked signal model by stacking successive samples of temporally adjacent received signal vectors and corresponding training vectors;
   generating an initial channel estimate and an initial estimate of a synchronization position for the received signal based on the spatially and temporally stacked signal model;
   computing a whitening filter based on the initial channel estimate and synchronization position;
   determining whether the initial channel estimate is known to be accurate;
   if the initial channel estimate is known to be accurate, utilizing the computed whitening filter to process the received signal; and
   if the initial channel estimate is not known to be accurate:
      generating a whitened signal and training sequence;
      finding an improved synchronization position based on the whitened signal and whitened training sequence;
      computing an improved channel estimate based on the whitened signal and whitened training sequence; and
      computing an improved whitening filter based on the improved channel estimate and the improved synchronization position.

2. The method of claim 1, wherein the step of generating a spatially and temporally stacked signal model includes generating a $2(M+1)$-dimensional received (column) vector by stacking the in-phase (I) and quadrature-phase (Q) components of M+1 temporally adjacent received signal samples, where M is an integer which may be arbitrarily chosen to be greater than or equal to 0.

3. The method of claim 1, wherein the step of generating a spatially and temporally stacked signal model includes generating a $N_r(M+1)$-dimensional received (column) vector by stacking $N_r$ times oversampled samples of M+1 temporally adjacent received signal samples, where M is an integer arbitrarily chosen to be greater than or equal to 0.

4. The method of claim 1, wherein the step of generating a spatially and temporally stacked signal model includes generating a $N_r(M+1)$-dimensional received (column) vector by stacking M+1 temporally adjacent received signal samples obtained from $N_r$ antennas, where M is an integer arbitrarily chosen to be greater than or equal to 0.

5. The method of claim 1, wherein the step of generating a spatially and temporally stacked signal model includes generating a $N_r(M+1)$-dimensional received (column) vector, where M is an integer which may be arbitrarily chosen to be greater than or equal to 0, said generating step including a combination of:
   stacking in-phase (I) and quadrature-phase (Q) components of the received signal ($N_r=2$);
   oversampling the received signal by a factor of $N_r$; and
   utilizing signals from $N_r$ antennas.

6. The method of claim 1, further comprising the steps of:
   determining whether a stopping criterion has been met;
   utilizing the latest estimate of the synchronization position, the latest channel estimate, and the latest estimate of the whitening filter to process the received signal if the stopping criterion has been met; and
   computing an improved synchronization position, an improved channel estimate, and an improved whitening filter if the stopping criterion has not been met.

7. The method of claim 6, wherein the stopping criterion is selected from a group consisting of:
   a predefined number of iterations;
   a determination that the percentage change in the channel estimation error is below or above a predefined channel-estimation threshold; and
   a determination that the percentage change in the log likelihood function is below or above a predefined log-likelihood-function threshold.

8. A method in a radio receiver of generating synchronization and channel estimation information for a received signal, said method comprising the steps of:
   generating a spatially and temporally stacked signal model by stacking successive samples of temporally adjacent received signal vectors and corresponding training vectors;
   generating an initial estimate of a whitening filter based on the spatially and temporally stacked signal model;
   generating a whitened signal and training sequence based on the initial estimate of the whitening filter;
   finding a synchronization position based on the whitened signal and whitened training sequence; and
   computing a channel estimate based on the whitened signal and whitened training sequence.

9. The method of claim 8, further comprising the steps of:
   determining whether a stopping criterion has been met;
   utilizing the latest estimate of the synchronization position, the latest channel estimate, and the latest estimate of the whitening filter to process the received signal if the stopping criterion has been met; and
   calculating an improved whitening filter, an improved synchronization position, and an improved channel estimate if the stopping criterion has not been met.

10. The method of claim 9, wherein the stopping criterion is selected from a group consisting of:
   a predefined number of iterations;

a determination that the percentage change in the channel estimation error is below or above a predefined channel-estimation threshold; and a determination that the percentage change in the log likelihood function is below or above a predefined log-likelihood-function threshold.

11. A method in a radio receiver of generating synchronization and channel estimation information for a received signal, said method comprising the steps of:

generating a spatially and temporally stacked signal model by stacking successive samples of temporally adjacent received signal vectors and corresponding training vectors;

generating an initial channel estimate based on the spatially and temporally stacked signal model;

finding a synchronization position for the received signal based on the initial channel estimate;

computing a whitening filter based on the initial channel estimate and the synchronization position;

generating a whitened signal and training sequence based on the computed whitening filter; and computing an improved channel estimate based on the whitened signal and training sequence.

12. The method of claim 11, further comprising the steps of:

determining whether a stopping criterion has been met;

utilizing the synchronization position, the computed whitening filter, and the improved channel estimate to process the received signal if the stopping criterion has been met; and re-calculating an improved synchronization position, an improved whitening filter, and the improved channel estimate if the stopping criterion has not been met.

13. The method of claim 12, wherein the stopping criterion is selected from a group consisting of:

a predefined number of iterations;

a determination that the percentage change in the channel estimation error is below or above a predefined channel-estimation threshold; and a determination that the percentage change in the log likelihood function is below or above a predefined log-likelihood-function threshold.

14. A method in a radio receiver of generating synchronization and channel estimation information for a received signal, said method comprising the steps of:

generating a spatially and temporally stacked signal model by stacking successive samples of temporally adjacent received signal vectors and corresponding training vectors;

generating initial estimates of a whitening filter and a synchronization position based on the spatially and temporally stacked signal model;

generating a whitened signal and training sequence based on the initial whitening filter;

computing a channel estimate based on the whitened signal and training sequence;

determining whether a stopping criterion has been met;

utilizing the latest estimate of the whitening filter, the latest estimate of the synchronization position, and the latest channel estimate to process the received signal if the stopping criterion has been met; and re-calculating an improved synchronization position, an improved whitening filter, and an improved channel estimate if the stopping criterion has not been met.

15. The method of claim 14, wherein the stopping criterion is selected from a group consisting of:

a predefined number of iterations;

a determination that the percentage change in the channel estimation error is below or above a predefined channel-estimation threshold; and a determination that the percentage change in the log likelihood function is below or above a predefined log-likelihood-function threshold.

16. A method in a radio receiver of generating synchronization and channel estimation information based on three parameters, said parameters consisting of a synchronization position, at least one whitening filter parameter, and a channel estimate, said method comprising the steps of:

generating a spatially and temporally stacked signal model by stacking successive samples of temporally adjacent received signal vectors and corresponding training vectors;

generating initial estimates of a first one or two of the three parameters based on the spatially and temporally stacked signal model;

computing the remainder of the three parameters based on the initial estimates of the first one or two parameters;

determining whether the initial channel estimate is known to be accurate; and if the initial channel estimate is not known to be accurate, recomputing the three parameters based on the previously computed parameters.

17. A device in a radio receiver for generating synchronization and channel estimation information based on three parameters, said parameters consisting of a synchronization position, at least one whitening filter parameter, and a channel estimate, said device comprising:

means for generating a spatially and temporally stacked signal model by stacking successive samples of temporally adjacent received signal vectors and corresponding training vectors;

means for generating initial estimates of a first one or two of the three parameters based on the spatially and temporally stacked signal model;

means for computing the remainder of the three parameters based on the initial estimates of the first one or two parameters;

means for determining whether the initial channel estimate is known to be accurate; and means responsive to a determination that the initial channel estimate is not known to be accurate, for recomputing the three parameters based on the previously computed parameters.

* * * * *